United States Patent
Niermeyer et al.

[19]

[11] Patent Number: 6,068,770
[45] Date of Patent: May 30, 2000

[54] DISPOSABLE SEPARATION MODULE WITH QUICK CONNECT CAPABILITY

[75] Inventors: J. Karl Niermeyer, Tyngsboro; Gastón de los Reyes, Boston; Christopher R. Wargo, Watertown; Richard L. Miller, Needham; Stephen K. Guerrera, Milford, all of Mass.

[73] Assignee: Millipore Corporation, Bedford, Mass.

[21] Appl. No.: 08/678,795

[22] Filed: Jul. 12, 1996

[51] Int. Cl.[7] .................................................. B01D 63/00
[52] U.S. Cl. ...................... 210/321.6; 210/450; 210/456; 210/433.1; 210/321.8; 210/447; 220/324
[58] Field of Search .............................. 210/321.6, 323.2, 210/450, 456, 433.1, 445, 321.8, 443, 447; 220/324

[56] References Cited

U.S. PATENT DOCUMENTS

| | | |
|---|---|---|
| 4,522,717 | 6/1985 | Brust ........................................ 210/238 |
| 4,535,997 | 8/1985 | Brust ........................................ 277/102 |
| 4,636,307 | 1/1987 | Inoue et al. ............................. 210/188 |
| 4,654,142 | 3/1987 | Thomsen et al. ....................... 210/232 |
| 4,719,012 | 1/1988 | Groezinger et al. ................... 210/232 |
| 4,806,240 | 2/1989 | Giordano et al. ...................... 210/232 |
| 4,857,191 | 8/1989 | Wolf ........................................ 210/286 |
| 5,066,391 | 11/1991 | Faria ........................................ 210/85 |
| 5,133,858 | 7/1992 | Walz et al. ............................. 210/321.8 |
| 5,143,575 | 9/1992 | Glassel et al. ....................... 156/309.9 |
| 5,167,814 | 12/1992 | Pulek ..................................... 210/232 |
| 5,401,401 | 3/1995 | Hickok et al. .......................... 210/440 |
| 5,601,710 | 2/1997 | Yoon et al. ............................. 210/232 |

FOREIGN PATENT DOCUMENTS

| | | |
|---|---|---|
| 0 818 228 A1 | 9/1997 | European Pat. Off. . |
| 3100564 | 1/1981 | Germany . |
| 7194905 | of 0000 | Japan . |
| 417805 | 2/1992 | Japan . |
| 52793 | 1/1993 | Japan . |
| 642921 | 6/1994 | Japan . |
| 729003 | 4/1995 | Japan . |
| 7232015 | 9/1995 | Japan . |
| 7110323 | 11/1995 | Japan . |
| 824856 | 1/1996 | Japan . |
| 852465 | 2/1996 | Japan . |
| 10005746 | 1/1998 | Japan . |

*Primary Examiner*—Ana Fortuna
*Attorney, Agent, or Firm*—J. Dana Hubbard, Esq.; Timothy J. King, Esq.

[57] ABSTRACT

A disposable separation module is disclosed which is capable of connecting to a fluid processing system in a quick-connect fashion. The module includes a housing containing a separation element with a plurality of fluid connectors on one end of the housing which are parallel to and exclusive of each other. This arrangement provides for essentially simultaneous engagement and fluid tight sealing of the fluid connectors to corresponding mating connectors on the fluid processing system. A retention mechanism is included which retains the entire module in fluid tight engagement by a single action without producing relative motion between the mating connectors.

6 Claims, 6 Drawing Sheets

DISPOSABLE SEPARATION MODULE WITH QUICK CONNECT CAPABILITY

BACKGROUND OF THE INVENTION

This invention relates to a fluid separation apparatus, and more specifically, to such an apparatus which includes an easily replaceable and disposable fluid separation module capable of engaging, and being retained in fluid tight relationship, with a mating connection device.

Fluid separation devices of the types described above have been used to control contamination in industrial processes for many years. Such devices are an integral part of the manufacture of many products including pharmaceuticals, food stuffs and beverages. However, nowhere is the need for effective contamination control greater than in the semiconductor fabrication industry. With circuit details in the submicron range and with further feature size reductions inevitable, the need for control of particulate, ionic, organic and other contaminants in semiconductor process fluids is essential. Also, because semiconductor devices are fabricated in clean rooms, it is important to minimize the potential of contaminating the manufacturing environment. For this reason disposable fluid separation devices are preferable in semiconductor fabrication processes in order to minimize contamination of the process lines as well as the clean room.

Examples of semiconductor process fluids which are processed at the point of use (POU) include those chemicals used in photolithographic processing (photochemicals). Photochemicals include materials such as primers, adhesion promoters, photoresists, edge bead removers, antireflective coatings, developers, dielectrics, and the like. Such chemicals are commonly dispensed onto the silicon wafer by a specialized pump and subsequently dispersed into a uniform thin film using a process called spin coating, and the purity of these chemicals at the POU is essential to producing acceptable product yields.

Fluid separation devices are in general of two types. In the first type, the separation element is a replaceable component, while the pressure vessel which houses the element, i.e. the housing, is reusable. The housing also contains appropriate fluid connections to the rest of the fluid processing system. Replacing the fluid separation element requires opening the housing, removing the separation element, installing the replacement separation element into the housing and closing the housing. There are many disadvantages to this type of fluid separation device. First, the replacement operation is time consuming, especially if access to the housing is restricted. Secondly, because the housing contains a quantity of the fluid being processed and because the fluid separation element is usually saturated with the fluid, spillage of the fluid usually occurs. In the case of hazardous fluids, spills can be a threat to the well-being of personnel in the area as well as potentially damaging to nearby equipment and facilities. Finally, the opening of the housing exposes the internal surfaces of the fluid processing system to unwanted contamination from the surrounding environment.

The second type of separation device is one in which the separation element is permanently attached to the housing, which also contains appropriate fluid connections to the rest of the fluid processing system, to form an integrated module. In this case, replacement involves disconnecting the entire separation module from the fluid processing system and reconnecting a replacement module to the system. In this manner replacement is easier, exposure of the operator to hazardous chemicals is minimized, the reliability of the connection is significantly improved, and contamination of the fluid processing system by the environment is reduced. This type of separation device is called a disposable module, since the whole module is removed and disposed of whenever the separation element requires replacement.

Different types of disposable separation modules are used in industrial applications. So called 'in-line' disposable modules have feed and effluent connections disposed at opposite ends of the housing. While there are virtues to this module configuration, they are obtained at the expense of several disadvantages. First, they are prone to fluid loss when the module is disconnected from the fluid processing system and special efforts are required to minimize leakage of fluid from the module and subsequent spillage on the equipment to which the module is connected. Secondly, fluid systems designed to accept in-line modules are more complicated due to the need for having two sets of fluid connections, one at the inlet end and another at the outlet end of the module, and thus are not readily adaptable for use with quick connect assemblies.

Another type of disposable module has all of the connections on one end of the housing with the feed and permeate connectors typically perpendicular to the body of the housing and opposed to each other thereby giving the module the shape of a "T". Such modules are therefore called "T-line" modules. T-line modules solve many of the problems associated with in-line modules. In particular, they prevent or reduce fluid loss during replacement if the end with the connections is on top, and the fluid processing system is simpler by virtue of having all fluid connections grouped in one location. However, T-line modules produce a dead-space, or non-swept volume of liquid, between the bottom of the separation element and the housing, which is undesirable.

Each of the types of disposable modules described above still require that each connection to the fluid processing system be individually made. A fluid connection requires two mating connectors, typically a male and female connector, and three separate actions to accomplish the connection, namely alignment of the bodies of the two mating connectors, engagement of the body of the male connector into the female connector to produce a fluid tight seal, and retention of the relative position of the two connectors to maintain the fluid tight seal under processing conditions. The design of mating connectors must thus include the ability to produce a fluid tight seal and some mechanism to retain the connectors in this arrangement.

The class of connectors commonly used have connector bodies that are circular in cross section, the body of the male connector being in the shape of a cylindrical rod, while that of the female connector being in the shape of a cylindrical well. The dimensions of the two connectors are such that, once engaged, they sealingly mate, i.e. fluid can flow from one connector to the other without any fluid loss, the sealing occurring at a single circular boundary between the mating connectors. Retention of the mating connectors in fluid tight engagement is accomplished by means of threaded fasteners (e.g. screw and nut pairs). This class of connectors produce a reliable seal by virtue of their simplicity in which only circular surfaces are used, and by the fact that each connection is exclusive of one another, i.e. no two connections share connector bodies or sealing boundaries/surfaces.

Regardless of what connector design is employed, disposable modules usually require that multiple connections be made sequentially, a minimum of two connections, and more typically three or four. Moreover, threaded fasteners are cumbersome and sometimes difficult to engage, factors which involve the subsequent consumption of additional time and effort. Furthermore, the module has to be held in place while the connections are being made, which makes the connection event even more difficult since it requires performing two actions at the same time (i.e., holding the module in place and attaching each connector sequentially). Finally, in those applications in which the permanent connections to the fluid processing system are not rigid, as for example when flexible tubing is used, liquid has a tendency to be discharged as the connections disengage. All of these problems exacerbate the time and effort required to replace a disposable module, in addition to still allowing for exposure of personnel to hazardous materials, and contamination of the manufacturing environment.

For these reasons, some disposable separation modules have been designed with features that allow them to be connected quickly and easily to the fluid processing system in a "quick-connect" fashion. These types of quick-connect modules provide for a set of connectors that sealingly engage with a single, simple stroke or action, to a mating set of connectors attached to a reusable substrate. Different types of mechanisms have been designed to accomplish quick-connect retention, all of which heretofore have required some form of relative motion between the male connector and its female counterpart, most commonly a twisting action.

Thomsen et al., in U.S. Pat. No. 4,654,142 describe a filtering system for water treatment which discloses the use of a separate and reusable head with connecting ports that sealingly mate to connecting ports on a disposable water purification cartridge. To facilitate the replacement of the disposable module, the two connecting ports are located on the same end of the disposable module, and are disposed to seal coaxially. A bayonet-type locking device is also attached to the module to retain it to the reusable head. The two ports as well as the locking device couple to a mating head to secure the module in a fluid tight fashion during use.

In another example, Groezinger et al., in U.S. Pat. No. 4,719,023, disclose a similar module and mounting device, describing the module as a "twist on disposable filter". According to this disclosure, the module and mounting device are connected by first aligning the bayonet lugs of the module with the appropriate bayonet recesses in the mounting device, axially inserting the module connector into the bore of the mounting device, then rotating the module about its longitudinal axis to engage the bayonet lugs and thereby retain the disposable filter.

While these quick-connect mechanisms address the convenience-of-use aspect of disposable fluid separation modules, they suffer from several deficiencies. First, the connectors share a common seal between the fluid inlet and outlet ports which is undesirable since a leak on the shared seal of the feed port would lead to contamination of the permeate stream with unpurified feed stream; furthermore, this contamination would go undetected. Secondly, the act of rotating the fluid separation module relative to the mounting device to lock together the two components inevitably generates particles as the sealing surfaces move relative to each other, thereby contaminating the fluid passages and ultimately the fluid being purified. Finally, these modules require that the connecting ports be grouped about the axis of rotation of the module which may compromise the liquid flow pattern and further complicate and constrain the fabrication of the module's housing and connector ports. Accordingly, it would be desirable to provide a fluid separation module of the quick-connect type that utilizes reliable fluid connections, and a retention mechanism which does not require relative motion between one connector and its mating counterpart.

SUMMARY OF THE INVENTION

The present invention overcomes the disadvantages and limitations of the prior art by providing a disposable fluid separation module capable of connecting to a fluid processing system in a quick-connect fashion, and having reliable and clean connections by utilizing the same class of industry-accepted connectors used in conventional (non-quick-connect) modules. By quick-connect fashion we mean a connection mechanism that allows the separation module to be connected quickly and easily, in a manner which provides essentially simultaneous engagement and fluid tight sealing between mating connectors with corresponding retention of the module by a single action without producing relative motion between the mating connectors. In accordance with the invention, the separation module to be connected in quick-connect fashion has all connectors located on the same end of the module to allow the module to be connected with a single motion or action. Additionally, the bodies of the connectors are parallel, or substantially so, to permit their simultaneous engagement. The module also has attached to its housing means for retaining the entire module in fixed, fluid tight position subsequent to its engagement.

In accordance with an important aspect of the invention necessary to achieve a reliable fluid tight connection, the connectors of the module do not share seals, and therefore, their connector bodies and sealing boundaries, with any of the other connectors, nor do the connectors contain more than one sealing boundary. As used herein, this type of connector is referred to as an exclusive connector. The quick-connect modules of the present invention are such that the exclusive connectors do not require (and in fact prohibit) twisting action for their retention, since exclusive connectors constrain the module in all directions except that defined by the common axis of engagement of the parallel connectors.

The incorporation of all of these unique features into the present fluid separation apparatus provides for a combination of benefits not possible until now.

It is therefore an object of this invention to provide for a disposable fluid separation module of the quick-connect type that overcomes the problems associated with such modules as described in the prior art. It is also an object of this invention to provide an easy-to-use, quick-connect, disposable fluid separation module which is easy-to-manufacture and provides reliable sealing. It is a further object of this invention to provide for a quick-connect mechanism that does not create additional contamination during the connection event.

These and other aspects and features of the present invention are described in detail in the following detailed description taken in conjunction with the appended drawings.

DETAILED DESCRIPTION OF THE INVENTION

An example of the application of this invention is in the POU purification of photochemicals used in the microelectronics manufacturing industry. Photochemical dispense pumps and POU fluid separation devices are typically found in a drawer mounted beneath the spin coating apparatus. There are sometimes as many as eight pumps per drawer, severely limiting access to POU fluid separation devices which may be close-coupled to the dispense pumps to eliminate extraneous external plumbing and potential fluid contamination. Particularly suitable dispense pump and separation devices are those in which the pump and separation device form an integrated system as disclosed in U.S. Pat. No. 5,262,068 whose disclosure is incorporated by reference. User-friendly separation modules capable of being connected in a quick-connect fashion would be preferable in this application.

Figure 1:
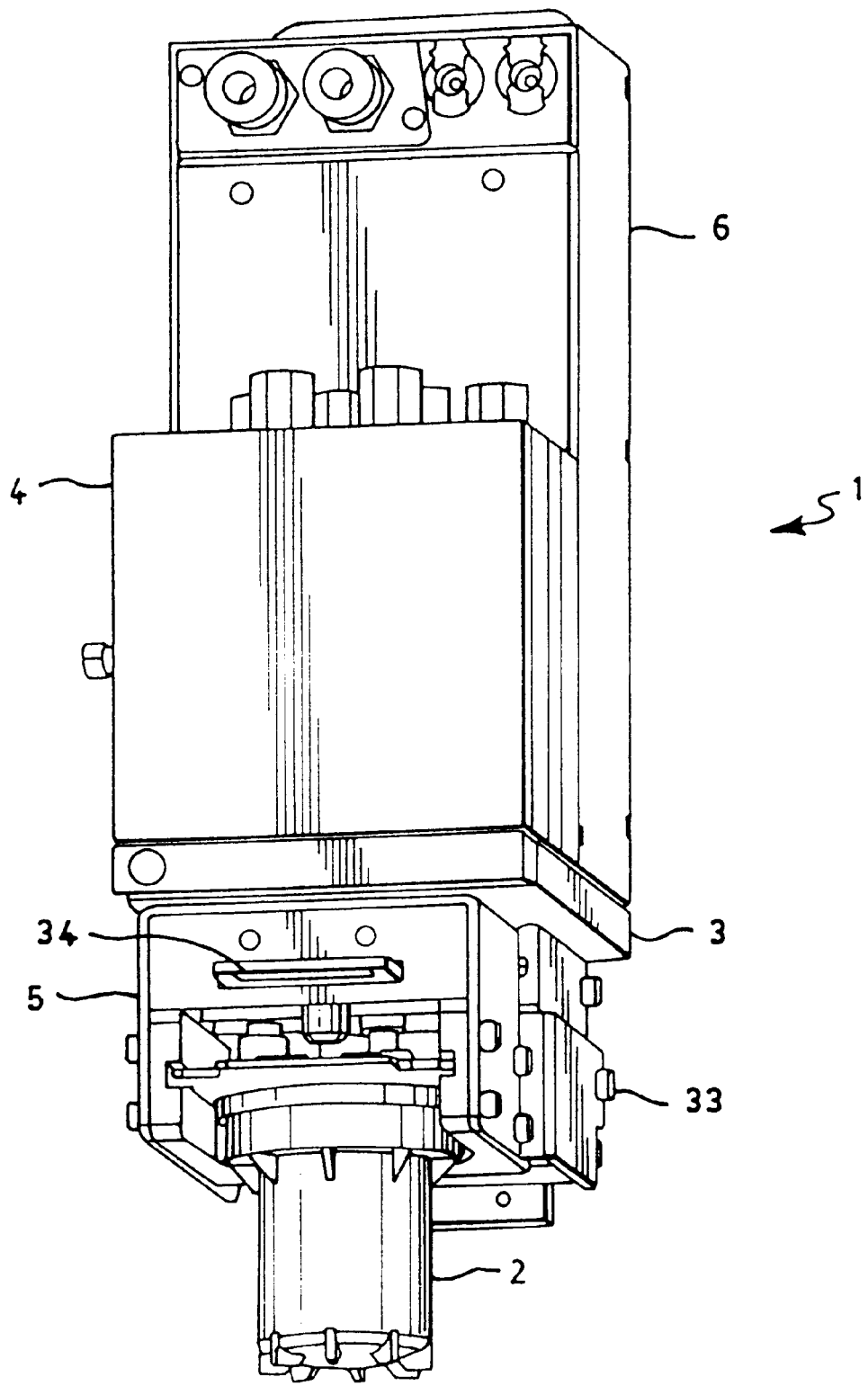
FIG. 1 is a perspective view of a preferred embodiment of this invention as practiced in the POU filtration of photochemicals, showing a mating fluid manifold block as an integral part of a dispense pump, with a disposable separation module containing a flange for its installation and alignment to the manifold block.
Figure 2:
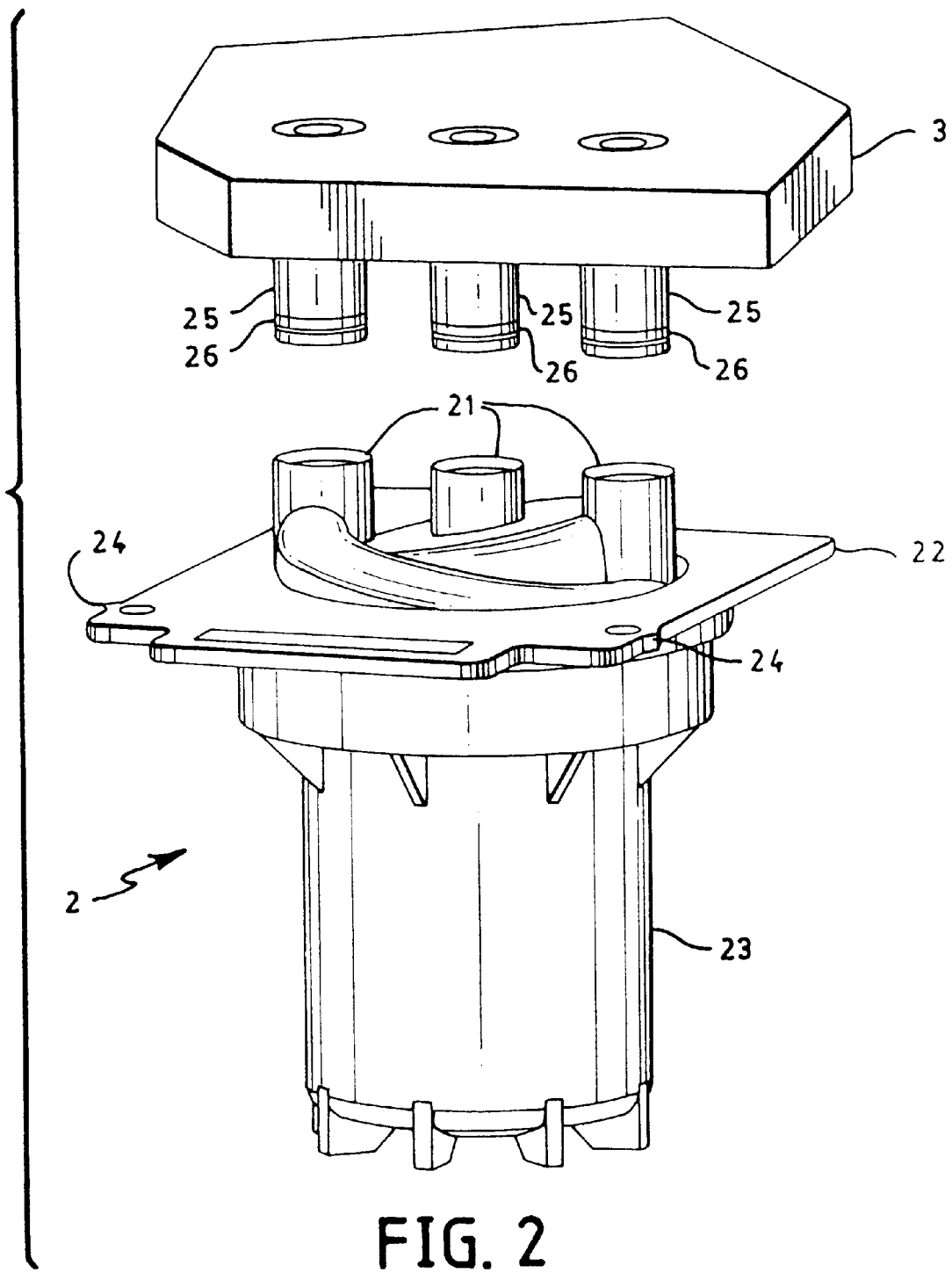
FIG. 2 is a perspective view of the module of FIG. 1 together with the lower portion of the manifold block showing more detail of the alignment and sealing of the module to the dispense pump.

A preferred embodiment of the present invention is shown in FIGS. 1, 2 and 3. FIG. 1 shows a perspective view of photochemical dispense system 1, which includes disposable filtration module 2, manifold block 3, pump 4 and module receptor 5. Also shown is pump controller 6 which controls the electronic and pneumatic signals going to and from the pump. The dispense system is similar in design and operation to that disclosed in U.S. Pat. No. 5,262,068. The manifold block 3, which is attached to pump 4, is reusable and designed to matingly accept and retain module 2 as will be described in more detail below.

FIG. 2 is a perspective view of disposable module 2 and a partially sectioned view of the lower portion of manifold block 3, showing details of the features that make module 2 capable of connecting to manifold block 3 in a quick-connect fashion. Module 2 has three female fluid connectors 21 on the top end of the module and in fluid communication with the separation element (not shown) within housing 23. The separation element may be of the flat sheet membrane type as described in U.S. Pat. No. 5,262,068, or more preferably may be composed of hollow fiber membranes of the type described in commonly assigned co-pending U.S. Application Ser. No. 08/674,599, filed Jun. 28, 1996, filed by Niermeyer and de los Reyes on Jun. 28, 1996, whose disclosure is hereby incorporated by reference.

The connectors 21 are spaced apart, parallel and exclusive to each other, so as to enable them to sealingly engage in quick-connect fashion to mating male connectors 25 on manifold block 3. Male connectors 25 are tubular extensions of the fluid passageways of pump 4, and are disposed on the lowermost portion of pump 4. Fluid tight sealing of the mating connector pairs 21 and 25 is accomplished by means of O-rings 26 attached to each of male connectors 25. Flange 22, attached to housing 23, positions the entire module 2 and further provides the module's alignment to manifold block 3 in conjunction with module receptor 5, and as such, assists in the retention of module 2 in sealing engagement to manifold block 3. In this particular embodiment flange 22 includes projections 24 to aid in precisely locating module 2 within the module receptor 5 which is designed to accept the disposable module. The size, shape and location of connectors 21 and flange 22 on module 2 are such as to make module 2 capable of being connected into manifold block 3 in a quick-connect fashion in conjunction with module receptor 5.

Figure 3A:
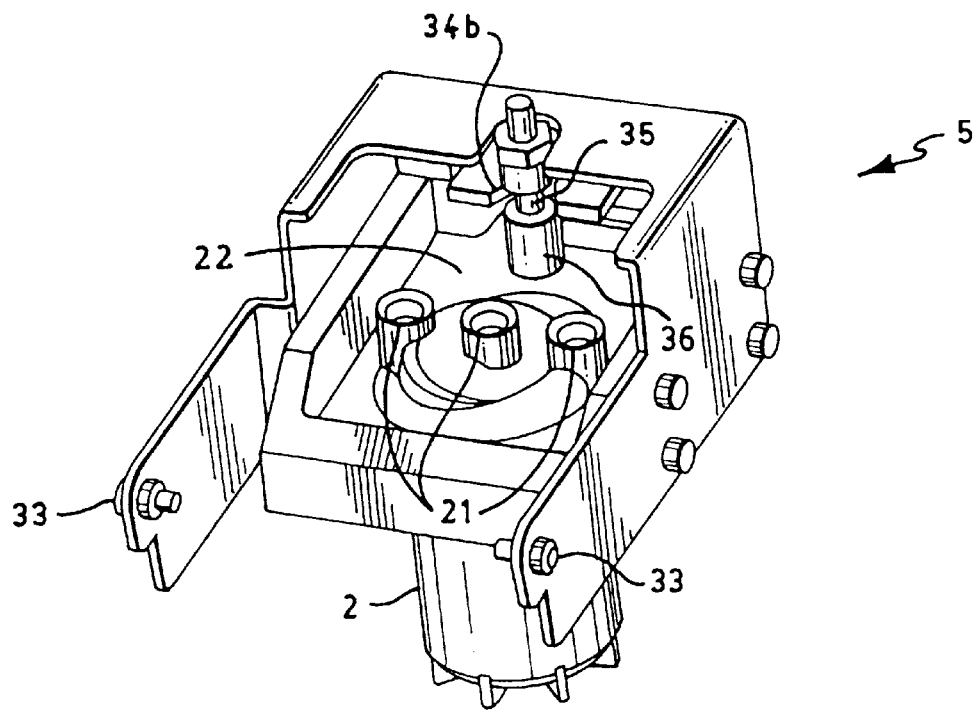
FIGS. 3a & b are perspective views of the module of FIG. 2 and a corresponding module receptor showing in more detail how the module fits into the module receptor.
Figure 3B:
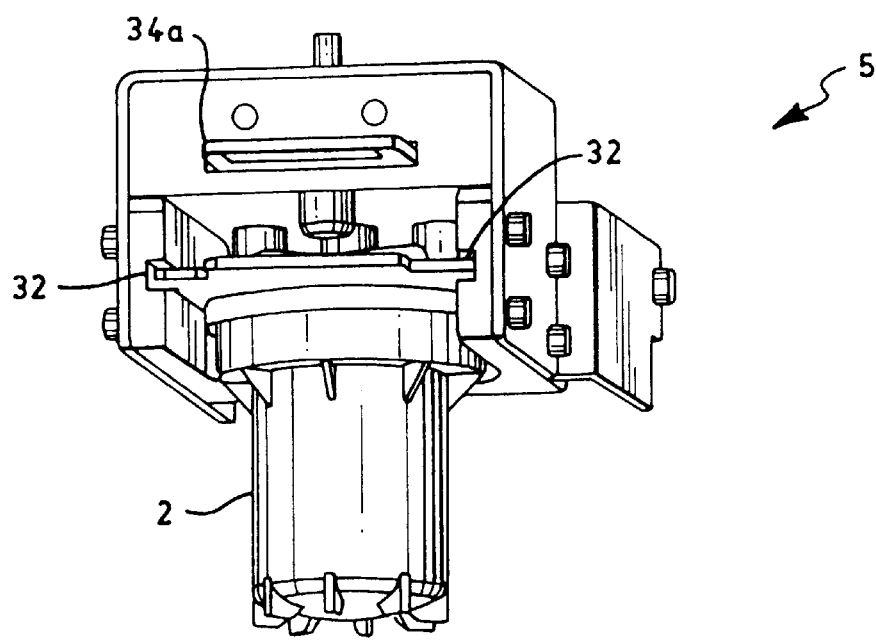

FIGS. 3a and 3b are perspective views of module receptor 5 (shown removed from the pump 4 in these views), which is attached to manifold block 3 showing module 2 positioned within receptor 5. The flange 22 mates with a pair of slots 32 in the body of receptor. The module receptor is attached to the manifold block 3 by hinges 33 which permit a limited range of substantially linear vertical movement which enables the disposable module 2 to be sealingly engaged with, and alternatively disengaged from, the male connectors 25 on the manifold block. The module receptor is further attached to the pump 4 by a spring-loaded latch 34, one end of which forms a handle 34a, with the opposite end thereof having a semicircular cutout 34b which interlocks with notch 35 on retainer post 36 which is affixed to the manifold block. This arrangement retains the module in sealing engagement with the pump after installation. The latch 34 is able to slide horizontally (i.e. in and out of the plane of FIG. 3b) in order to unlock from the notch on the retainer post thereby allowing the receptor 5 to pivot downwardly on hinges 33 for module replacement. When the mating connectors are disengaged, cutout 34b rests under tension against retainer post 36.

The process of replacing disposable filtration module 2 is accomplished by pulling the handle 34a forward, i.e. in a direction that is substantially perpendicular to the direction of motion required for engaging the female connectors 21 to the male connectors 25. This unlocks latch 34 from retainer post 36 and permits the unhinged end of module receptor 5 to be freed from the pump 4, thereby allowing the entire module 2 to pivot downward on hinges 33 a distance sufficient to move connectors 21 on the module out of sealing engagement with mating connectors 25 on manifold block 3. With the module receptor 5 in this lowered position, module 2 may be removed from the dispense system by sliding it out of the slots 32. A replacement filtration module may then be inserted into the slots followed by pivoting module receptor 5 upward to engage connectors 21 into sealing engagement with mating connectors 25 on the manifold block. When replacement module 2 is in sealing engagement with mating connectors 25, cutout 34b automatically locks into notch 35 thereby retaining the filtration module in sealing engagement to the manifold block during fluid processing conditions.

As seen from the foregoing description of the removal and installation of filtration module 2, the engagement and sealing of mating connectors 21 and 25 is effected by a first substantially linear motion which is parallel to the axis defining the body of the connectors. The interlocking of the matable elements and consequent retention of the module is then accomplished without relative motion between the mating connectors by a second substantially linear motion which is perpendicular to the first motion corresponding to engagement and sealing of the connectors. Also, it is clear that the present quick-connect arrangement provides simultaneous connection and sealing of all the connectors on the top of the disposable filtration module 2. However it is apparent that the benefits so derived apply equally even if the module receptor 5 were swung in a greater arc and even if the mating connectors were engaged somewhat sequentially so long as the engagement and retention is effected rapidly and easily enough to be considered a "quick-connect".

Alternative Embodiment

Figure 4A:
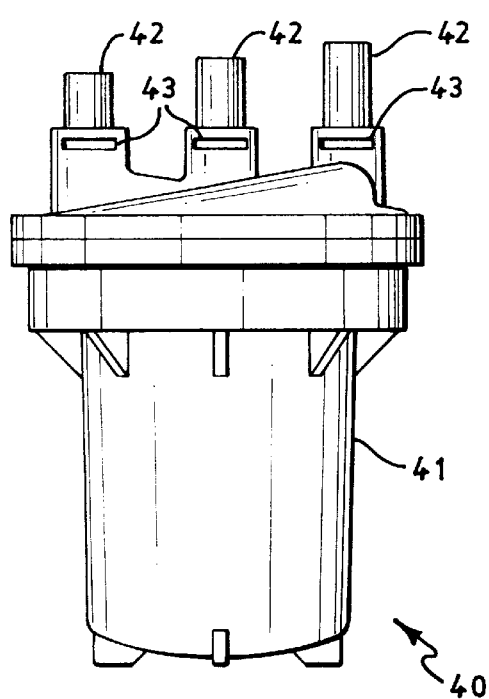
FIGS. 4a & b are side views of a separation module used in an alternative embodiment of this invention showing details of the module connecting ports and slots for retaining the module to a reusable manifold block.
Figure 4B:
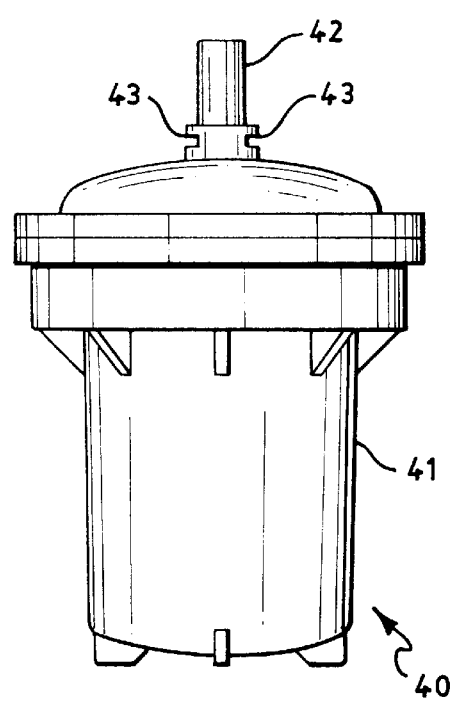

FIGS. 4a and b show another embodiment of this invention. In this embodiment, disposable filtration module 40 includes housing 41, male connectors 42 located on the top end of the housing and a pair of slots 43 in the form of grooved recesses disposed on opposite sides near the base of each of male connectors 42. The connectors are in fluid communication with a separation element (not shown) contained within the housing. The size, shape and location of connectors 42 and slots 43 on module 40 are such as to make module 40 capable of being connected into a reusable manifold block in a quick-connect fashion as will be explained below.

Figure 5A:
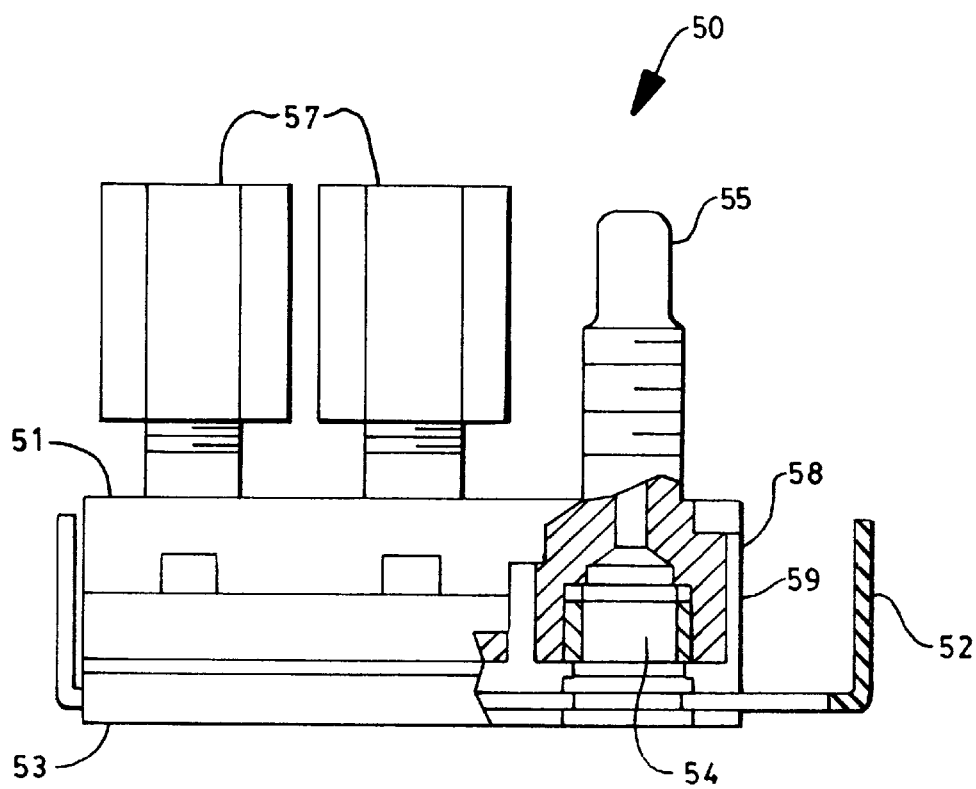
FIGS. 5a, b, c & d are partially sectioned views of a reusable manifold block disposed to mate with the separation module of FIG. 4 which is particularly suited for applications in which the manifold block is not integrated into another component of a fluid processing system, and showing details of the manifold block and the mechanism for retaining the module to the manifold block.
Figure 5B:
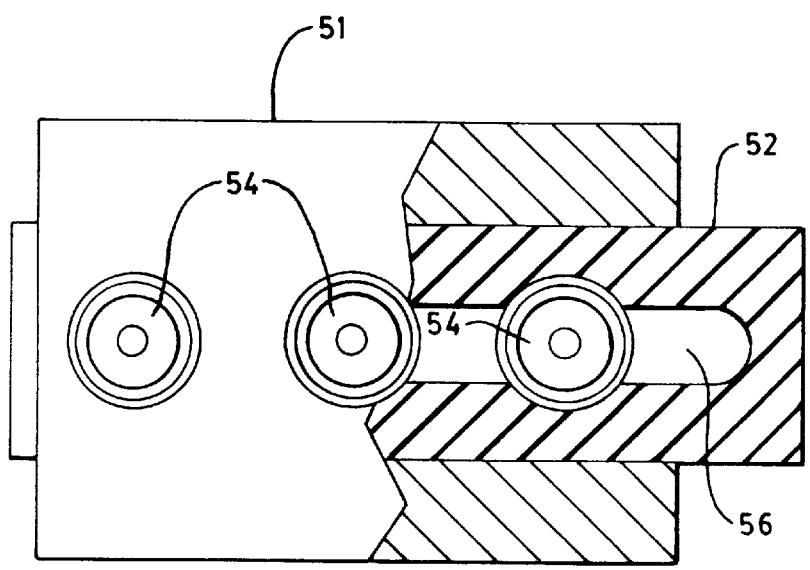
Figure 5C:
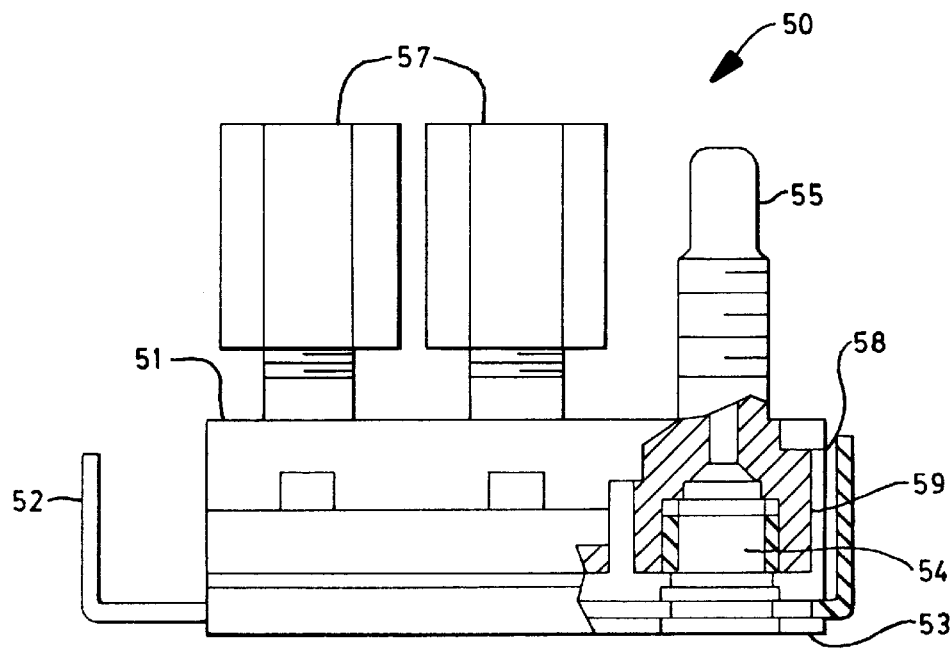
Figure 5D:
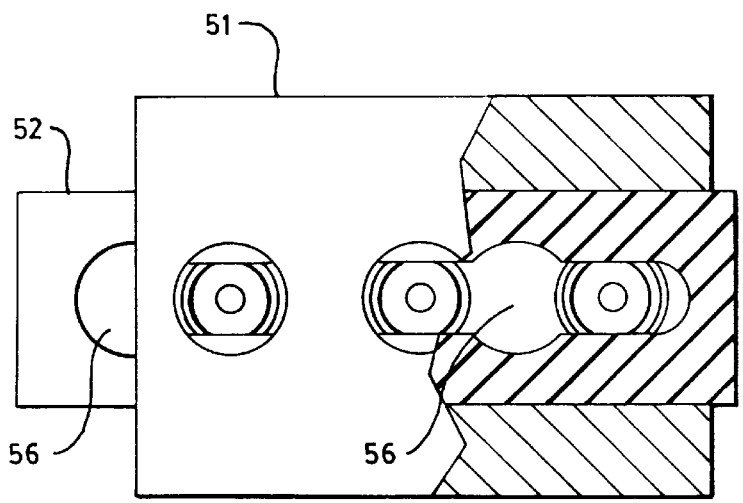
Figure 6:
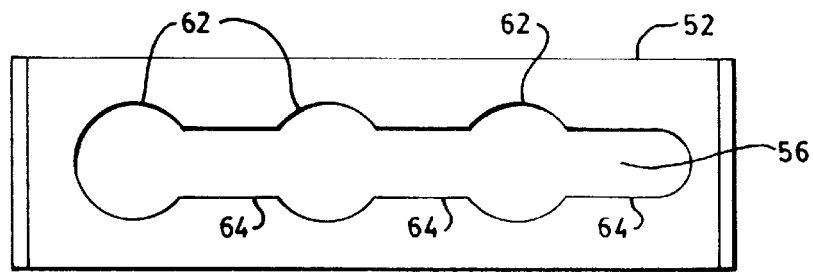
FIG. 6 is an elevation view of a retaining plate used with the embodiment shown in FIG. 5.

FIGS. 5a, b, c and d show multiple views of a reusable manifold block 50 for use with module 40 which includes body 51 and sliding retaining plate 52 which is held to body 51 by means of end plate 53. Female connectors 54, located on the lower end of body 51 are disposed to accept, in fluid tight sealing engagement, male connectors 42 on module 40. Sealing is accomplished by means of O-rings 58 held in place by O-ring retainer 59 in each of the female connectors 54. Conventional fluid connectors 55 are located on the top end of body 51 and are adapted to connect to a fluid processing system (not shown) by means of tubing (not shown) and mating nuts 57. Sliding plate 52 has longitudinal perforation 56 (see also FIG. 6) in the form of a slot with three enlarged circular-like openings 62 which are sized and shaped to allow module 40 to sealingly engage with manifold block 50 when sliding plate 52 is in the retracted (unlocked) position (FIGS. 5a and 5b). After module 40 has been sealingly engaged, sliding plate 52 is moved to the locking position (FIGS. 5c and 5d) and three narrowed openings 64 of perforation 56 mate with slots 43 on module 40 thereby firmly retaining module 40 to manifold block 50. Although it is possible to attach manifold block 3 to the fluid processing system solely by virtue of the fastening of connectors 55, making the block a separate, "stand-alone" component as described above, body 51 may also include a bracket or other means of attachment (not shown) so as to permanently affix the manifold block to the fluid processing system.

The method of replacing a spent module and connecting a new module in quick-connect fashion is summarized by the following steps:

1. sliding plate 52 is retracted (position as shown on FIG. 5a and 5b);
2. spent module 40 is removed by pulling it vertically downward;
3. new module 40 is positioned below reusable manifold block 50 and aligned such that the male connectors 42 are vertically below the female connectors 54;
4. module 40 is pushed vertically upward engaging it into manifold block 50;
5. sliding plate 52 is pushed into its locking position (FIG. 5c and 5d) thereby retaining module 40 in sealing engagement with manifold block 50.

While the examples presented illustrate the versatility of the present invention, as well as its essential features, it should be understood that there are numerous variations that from time to time may be preferable to those presented here. Examples of variations not shown but intended to be covered are: seals that do not require the use of O-rings; module fluid connectors perpendicular to the longitudinal axis of the housing (i.e. perpendicular to the orientation of the connectors shown in the drawings); other means of aligning the separation module to the manifold block, as for example the inclusion of counterbores or pins on the housing instead of flanges and slots; other mechanisms for producing the motion required for the engagement of the module to the manifold block, as for example, the use of retractable clamps or a jack; other means of retention of the module in sealing engagement to the fluid manifold block, as for example the use of cams, levers or pins instead of latches and sliding plates. Furthermore, although specific reference has been made as to the type of separation element used, this invention is intended to be useful for any of the numerous varieties of separation elements known to those skilled in the art, as for example: conventional filters, membrane filters (MF, UF and RO), chromatography columns, adsorptive media cartridges (e.g. ion exchange, activated carbon and specific ligands) and membrane filters embedded with adsorptive resin media. Finally, it should be recognized that even though reference has been made to the needs of the semiconductor industry, and even to some specific applications within that industry, other applications in other industries have similar requirements, as for example in the nuclear, biological, biotech and pharmaceutical industries, in which safety, containment and ease of filter replacement are also critical.

We claim:

1. A separation device comprising:
    a disposable separation module including
        a housing including a plurality of connector means integral with said housing and located on one end of said housing and being in fluid communication with the interior thereof;
        a separation element within said housing;
        said housing including a first matable element sized and shaped to be retained by a second reusable matable element on a substrate; wherein said first matable element are slot means in the side walls of each of said plurality of connector means for engaging a moveable latch attached to said substrate or said second matable element;
        said connector means being parallel and spaced apart from one another and exclusive of one another whereby said module is capable of being connected to said substrate in a quick-connect fashion.

2. The module of claim 1 wherein said slot means is a laterally extending horizontal groove.

3. A fluid separation apparatus comprising:
    a disposable separation module;
    a fluid connector member;
    said separation module including:
        a housing;
        a separation element contained within said housing;
        a first set of a plurality of connector means located on one end of said housing and being in fluid communication with the interior thereof for introducing and withdrawing fluids from the interior of said housing, said first set of connector means being parallel and spaced apart from one another and being exclusive of one another;

said fluid connector member including a second set of a plurality of connector means being positioned and sized and shaped to engage in fluid tight relationship with said first set of connector means, wherein said fluid tight engagement is effected through a first motion which during said engagement is substantially linear and parallel to the axes of both said first and second set of connector means; and retention means for locking said separation module to said fluid connector member wherein said locking is accomplished by a second motion which is substantially perpendicular to said first motion, wherein said retention means includes a receptor mounted to said fluid connector member for receiving, aligning and retaining said separation module and further including moveable latching means mounted either on said fluid connector member or said separation module, said latching means being moveable in a plane substantially perpendicular to said first motion thereby locking said connector member to said separation element.

4. The apparatus of claim 3 wherein said receptor is hinged to provide substantially linear motion during said first motion.

5. The apparatus of claim 4 wherein said fluid connector member is integrally joined to a component of a fluid processing system.

6. The apparatus of claim 5 wherein said component is a pump for pumping and filtering photochemical solutions within said fluid processing system.

* * * * *